(12) United States Patent
Osaki et al.

(10) Patent No.: US 7,383,462 B2
(45) Date of Patent: Jun. 3, 2008

(54) METHOD AND APPARATUS FOR ENCRYPTED REMOTE COPY FOR SECURE DATA BACKUP AND RESTORATION

(75) Inventors: Nobuyuki Osaki, Campbell, CA (US); Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 213 days.

(21) Appl. No.: 10/882,432

(22) Filed: Jul. 2, 2004

(65) Prior Publication Data

US 2006/0005048 A1   Jan. 5, 2006

(51) Int. Cl.
- *G06F 11/00* (2006.01)
- *H04K 1/00* (2006.01)
- *H04L 9/32* (2006.01)

(52) U.S. Cl. ............... 714/2; 714/7; 714/8; 705/50; 713/193; 713/194

(58) Field of Classification Search ............... 705/50; 707/202, 204; 713/193–194; 714/1–8, 40–42
See application file for complete search history.

(56) References Cited

U.S. PATENT DOCUMENTS

| | | |
|---|---|---|
| 5,235,641 A | 8/1993 | Nozawa et al. |
| 5,495,572 A | 2/1996 | Tanaka et al. |
| 5,592,618 A * | 1/1997 | Micka et al. ............... 714/54 |
| 5,659,614 A * | 8/1997 | Bailey, III ............... 713/165 |
| 5,680,574 A | 10/1997 | Yamamoto et al. |
| 5,909,700 A | 6/1999 | Bitner et al. |
| 5,940,507 A | 8/1999 | Cane et al. |
| 6,199,074 B1 * | 3/2001 | Kern et al. ............... 707/204 |
| 6,321,175 B1 | 11/2001 | Dahl |

(Continued)

FOREIGN PATENT DOCUMENTS

WO   WO 02/093314 A2   5/2002

OTHER PUBLICATIONS

"Data Encryption Standard (DES)", U.S. Department of Commerce, National Institute of Standards and Technology, Oct. 25, 1999, pp. 1-22.

(Continued)

*Primary Examiner*—Andrew J. Fischer
*Assistant Examiner*—Charlie C. L. Agwumezie
(74) *Attorney, Agent, or Firm*—Reed Smith LLP; Stanley P. Fisher, Esq.; Juan Carlos A. Marquez, Esq.

(57) ABSTRACT

Data at a primary storage system is encrypted and remote copied to a secondary storage system. A Remote Copy Configuration Information (RCCI) is created that identifies the encryption mechanism, keys, data source volume, and target volume for the remote copy. The RCCI is backed up on a trusted computer system. In one embodiment, the secondary storage system is an off-site data storage system managed by a third party. Upon detection of a failure in the primary storage system, the encrypted data and RCCI are transferred to a tertiary server, which is optionally created upon detection of the failure, and operations of the failed primary server are resumed by the tertiary server. In one embodiment, the failure is detected by loss of a heart beat signal transmitted from the primary storage system to a management server that initiates the transfers to the tertiary server.

52 Claims, 13 Drawing Sheets

U.S. PATENT DOCUMENTS

| | | | |
|---|---|---|---|
| 6,321,201 | B1 | 11/2001 | Dahl |
| 6,446,175 | B1 | 9/2002 | West et al. |
| 6,484,245 | B1 | 11/2002 | Sanada et al. |
| 6,574,733 | B1 * | 6/2003 | Langford ............... 713/194 |
| 6,643,795 | B1 * | 11/2003 | Sicola et al. ............ 714/6 |
| 6,697,960 | B1 | 2/2004 | Clark et al. |
| 6,745,303 | B2 | 6/2004 | Watanabe |
| 7,287,137 | B2 * | 10/2007 | Ji et al. ............... 711/162 |
| 2003/0037247 | A1 * | 2/2003 | Obara et al. ............ 713/193 |
| 2004/0153719 | A1 * | 8/2004 | Achiwa et al. ........... 714/5 |
| 2004/0236958 | A1 * | 11/2004 | Teicher et al. .......... 713/193 |
| 2006/0005074 | A1 * | 1/2006 | Yanai et al. ............ 714/5 |

OTHER PUBLICATIONS

"Data Encryption Standard (DES)", Federal Information Processing Standards Publication 46-2, Jan. 22, 1988, http://www.itl.nist.gov/fipspubs/fip46-2.htm, pp. 1-16.

Alan Freier et al., "The SSL Protocol Version 3.0", (Nov. 18, 1996) Transport Layer Security Working Group, http://wp.netscape.com/eng/ssl3/draft302.txt, pp. 1-55.

Win Treese et al., "Transport Layer Security (tls)", *Nov. 14, 2003) http://www.ietf.org/html.charters/tls-charter.html, pp. 1-2.

"Data Encryption Standard (DES)", Federal Information Processing Standards Publication 46-2, Jan. 22, 1988, http://www.itl.nist.gov/fipspubs/fip46-2.htm, pp. 1-16.

Alan Freir et al., "The SSL Protocol Version 3.0", (Nov. 18, 1996) Transport Layer Security Working Group, http://wp.netscape.com/eng/ssl13/draft302.txt, pp. 1-55.

Win Treese et al., "Transport Layer Security (tls)"*Nov. 14, 2003) http:// ietf.org.charter/tls-charter.html, pp. 1-2.

"Data Encryption Standard (DES)", U.S. Department of Commerce National Institute of Standards and Technology, Oct. 25, 1999, pp. 1-22.

"Data Encryption Standard (DES)", Federal Information Processing Standards Publication 46-2, Jan. 22, 1988, http:// www.itl.nist.gov/fipspubs/fip46-2.htm, pp. 1-16.

Alan Freier et al., "The SSL Protocol Version 3.0", (Nov. 18, 1996) Transport Layer Security Working Group, http://wp.netscape.com/eng/ssl3/draft302.txt, pp. 1-55.

Win Treese et al., "Transport Layer Security (tls)", *Nov. 14, 1996) http://www.ietf.org/html.charter/tls-charter.html, pp. 1-2.

"Data Encryption Standard (DES)", U.S. Department of CommerceNational Institute of Standards and Technology, Oct. 25, 1999, pp. 1-22.

"Data Encryption Standard (DES)", Federal Information Processing Standards Publication 46-2, Jan. 22, 1988, http://www.itl.nist.gov/fipspubs/fip46-2.htm, pp. 1-16.

Alan Freier et al., "The SSL Protocol Version 3.0", (Nov. 18, 1996) Transport Layer Security Working Group, http:// wp.netscape.com/eng/ssl3/draft302.txt, pp. 1-55.

Win Treese et al., "Transport Layer Security (tls)", *Nov. 14, 2003) http://www.ietf.org/html/charter/tls-charter.html, pp. 1-2.

"Data Encryption Standard (DES)", Federal Information PRocessing Standards Publication 46-2, Jan. 22, 1988, http://www.itl.nist/gov/fipspubs/fip46-2, pp. 1-16.

Alan Freier et al., "The SSL Protocol Version 3.0", (Nov. 18, 1996) Transport Layer Security Working Group, http://wp.netscape.com/eng/ssl3/draftr302.txt, pp. 1-55.

Win Treese et al., "Transport Layer Security (tls)", *Nov. 14, 2003) http://www.ietf.org/html.charter/tls-charter.html, pp. 1-2.

* cited by examiner

METHOD AND APPARATUS FOR ENCRYPTED REMOTE COPY FOR SECURE DATA BACKUP AND RESTORATION

BACKGROUND OF THE INVENTION

1. Field of Invention

The present invention is related to secure data storage and restoration. The invention is yet more particularly related to data storage/backup at facilities that are not necessarily secure, such as secondary storage facilities outsourced to third parties. The invention is also related to encryption, security and backup of encryption algorithms, keys, and other storage related information, and restoration of encrypted off-site stored back-up data.

2. Discussion of Background

Data storage systems are common in all levels of modem business and personal enterprises. Maintaining data storage that is easily recoverable upon a failure is a necessity. Proprietary information, trade secrets, financial information, accounting, personal data, and other important records are all maintained electronically. Loss, corruption, or theft of that information is unacceptable and is potentially economically disastrous. To protect against such loss, a number of data storage solutions have been developed and implemented.

Many of those solutions rely upon transfer of the data, on a periodic basis, from the main data storage facility to some form of storage medium for protective custody elsewhere. The protective custody is often off-site at a second party and may be managed by a third party. The protective custody is often accessed over a network, and data owners often have little or no control over physical and/or electronic security measures implemented by the second and third parties.

"Remote copy" is one of the technologies available for replicating data at a remote storage facility. When employed, this technology will perform a data transfer from the main or local storage facility to the remote storage facility each time data is written and/or updated to a storage device of the local facility. However, remote copy, and other current implementations of backup and restore technologies have many problems in the areas of security and management of recovery.

SUMMARY OF THE INVENTION

The present inventors have realized the need for secure backup and restoration of data, particularly in systems where backups are stored off site and perhaps managed by third party vendors. The present inventors have also realized the need for reliable and secure backup of encryption information used to securely store data at off-site facilities and methods to facilitate recovery of a primary storage system upon failure.

Thus, the invention focuses on the situation where data processed at primary site is copied to secondary storage system whose management is outsourced to 3rd party organization, and data stored on the secondary storage system is encrypted by the primary storage system before being copied for fear that the data is read and stolen at secondary site maliciously.

In this situation, keys which are used to encrypt the data need to be backed up in case primary storage system fails, and the entire system is preferably organized and managed to facilitate seamless recovery.

The primary storage system encrypts data before it copies data to secondary storage system, and decrypts data and stores in it when it receives encrypted data from the secondary storage system. The primary storage system also backs up remote copy configuration information to a trusted computer system which could be a server or a tertiary storage system. Remote copy configuration information may include cryptographic keys, cryptographic algorithm ID, ID and size of target volume which stores data copied from primary storage system.

When the primary storage system fails, remote copy configuration information is loaded at tertiary storage system, and the tertiary storage system prepares for receiving encrypted data from secondary storage system-by-creating volume, loading keys and so on, based on the remote copy configuration information and then receives and decrypts encrypted data and store the data inside.

In one embodiment the present invention is a method, comprising the steps of, encrypting data, storing the encrypted data in a target volume, creating an information record comprising identifiers for each of a source location of the data encrypted, the target volume, and an encryption mechanism used to encrypt the data, and storing the information record at a location other than the source location of the data encrypted in the encrypting step.

In another embodiment, the present invention is a method comprising the steps of, receiving an authentication and encryption information record request at a secure module, verifying the authentication request at the secure module, if the request is verified, storing the requested encryption information record on a tertiary server, transferring a primary storage system's encrypted data to the tertiary server, decrypting the encrypted data using the encryption information record, and resuming operations of the primary server at the tertiary server using the decrypted data.

In yet another embodiment, the present invention comprises a data system, comprising, a primary storage system comprising at least one volume of data storage, a secondary storage system comprising at least one volume of data comprising a encrypted backup copy of the primary storage system volume, and a management server, wherein, the primary storage system further comprises cryptographic information and a decryption and restoration mechanism sufficient to decrypt and restore encrypted data from the secondary storage system to the primary storage system, and the management server maintains a back-up copy of the cryptographic information.

In yet another embodiment, the present invention comprises a data system, comprising, a primary storage system comprising at least one data volume and an encryption mechanism configured to encrypt and remote copy data stored on the primary storage system, a secondary storage system comprising at least one data volume, and a secure module, wherein the primary storage system is configured to, encrypt data stored on the primary storage system, remote copy the encrypted data to the secondary storage system, prepare a remote copy configuration information (RCCI) record identifying information about the encrypted data that is remote copied to the secondary storage system, and transfer the RCCI to the secure module.

In still yet another embodiment, the present invention comprises method, comprising the steps of, encrypting a volume of data of a primary storage system, storing the encrypted primary volume on a secondary storage system, and storing information identifying the encryption on at least one restoration capable storage system, wherein the at least one restoration capable storage system is configured to perform restoration of data from the secondary storage system.

Portions of the invention may be conveniently implemented in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED
EMBODIMENTS

Figure 1:
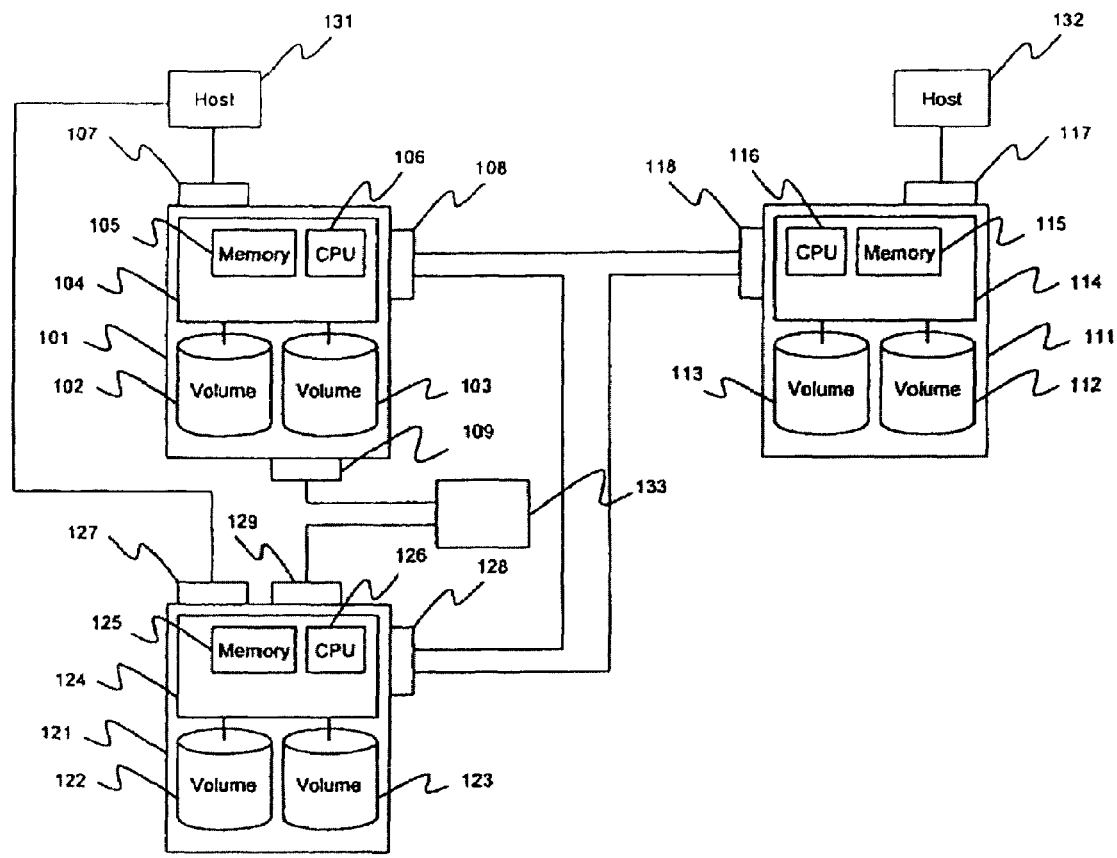
FIG. 1 is a block diagram of a configuration of hosts and storage systems according to an embodiment of the present invention.

Referring now to the drawings, wherein like reference numerals designate identical or corresponding parts, and more particularly to FIG. 1 thereof, there is illustrated a basic configuration of an embodiment of the present invention. Three storage systems are illustrated in FIG. 1, primary storage system 101, secondary storage system 111, and tertiary storage system 121. The basic hardware components and interconnections of each storage system may be, for example, similarly arranged. Each storage system (e.g., 101, 111, or 121) is, for example, connected to a host (e.g., host 131 for storage systems 101 and 121, and host 132 for storage system 111) through an I/O interface (e.g., I/O interfaces 107, 117, or 127 respectively). Each storage system receives read and write requests for data stored on volumes, such as 102, 103, 112, 113, 122, and 123, from the connected host (e.g., 131 or 132).

Volumes 102, 103, 112, 113, 122, and 123 can be logical volumes and do not necessarily correspond to physical entities. Further, although illustrated as co-located with corresponding hosts, the present invention includes configurations where the volumes are at physically remote locations. I/Os from the host (e.g., 131 or 132) are, for example, processed by disk controller (e.g., 104, 114, or 124). The disk controllers comprise, for example, at least a CPU (e.g., CPUs 106, 116, or 126) and memory (e.g., memories 105, 115, or 125).

Primary storage system 101 is coupled to secondary storage system 111 and tertiary storage system 121 through interfaces 108, 118, and 128. The interfaces are coupled, for example, via any of direct cabling (e.g., fiber optic, coax), a network, and wireless connectivity (e.g., IEEE 802.11). In operation, in one embodiment, primary storage system 101 is replaced with tertiary storage system 121 in the event primary storage system 101 fails. Although tertiary storage system 121 is illustrated as connected to host 131 and secondary storage system 111, in one embodiment, tertiary storage system 121 is not connected to host 131 and secondary storage system 111 until primary storage system 101 fails. Similarly, in some embodiments, tertiary storage system 121 is not connected to primary storage system 101 until it is required. Tertiary storage system 121, for example, can be configured identical to primary storage system 101 so that it can substitute for primary storage system 101 anytime, however, it is assumed hereafter that tertiary storage system 121 is used for other purposes prior to the failure.

In one embodiment, tertiary storage system 121 does not even have to exist until primary storage system 101 fails. For example, tertiary storage system 121 may be constructed from a pool of available storage space by a management server upon recognition of a failure in the primary storage system.

In an example operation, data created at host 131 is written on a volume (e.g., any of vol. 102 and vol. 103) in primary storage system 101. Then the data is encrypted and transferred to a predefined target volume. The predefined target volume is, for example, any of vol. 112 and vol. 113 in secondary storage system 111. The encryption of the data is performed using an encryption mechanism which is, for example, comprised of CPU 106 and memory 105 where an encryption algorithm and appropriate keys are deployed. The encrypted data is transferred to secondary storage system 111 via I/O interfaces 108 and 118. Secondary storage system 111 stores the encrypted data to the intended volume such as vol. 112 and vol. 113 without decrypting it, so that anyone that accesses the secondary storage system (either with proper authority or maliciously) cannot see the actual content of the data. Hereafter, it is assumed that data in volume 102 and 103 is copied to volume 112 and 113 respectively.

When primary storage system 101 needs to restore data from the secondary storage system 111, data in encrypted form is transferred to the primary storage system 101. The encryption mechanism, (e.g., CPU 106, memory 105, encryption algorithm, and keys), decrypts the transferred data and stores it in primary storage system 101. For example, primary storage system 101 sends a request to secondary storage system 111 for data that was encrypted from vol. 102 Secondary storage system locates the requested data on vol. 112 and sends it to the primary storage system for decryption and storage on vol. 102.

Tertiary storage system 121 also has encryption and decryption capability. Secondary storage system 111 does not have to be equipped with encryption and/or decryption capability. However, in some embodiments, encryption and decryption capability may be installed and utilized.

Figure 2:
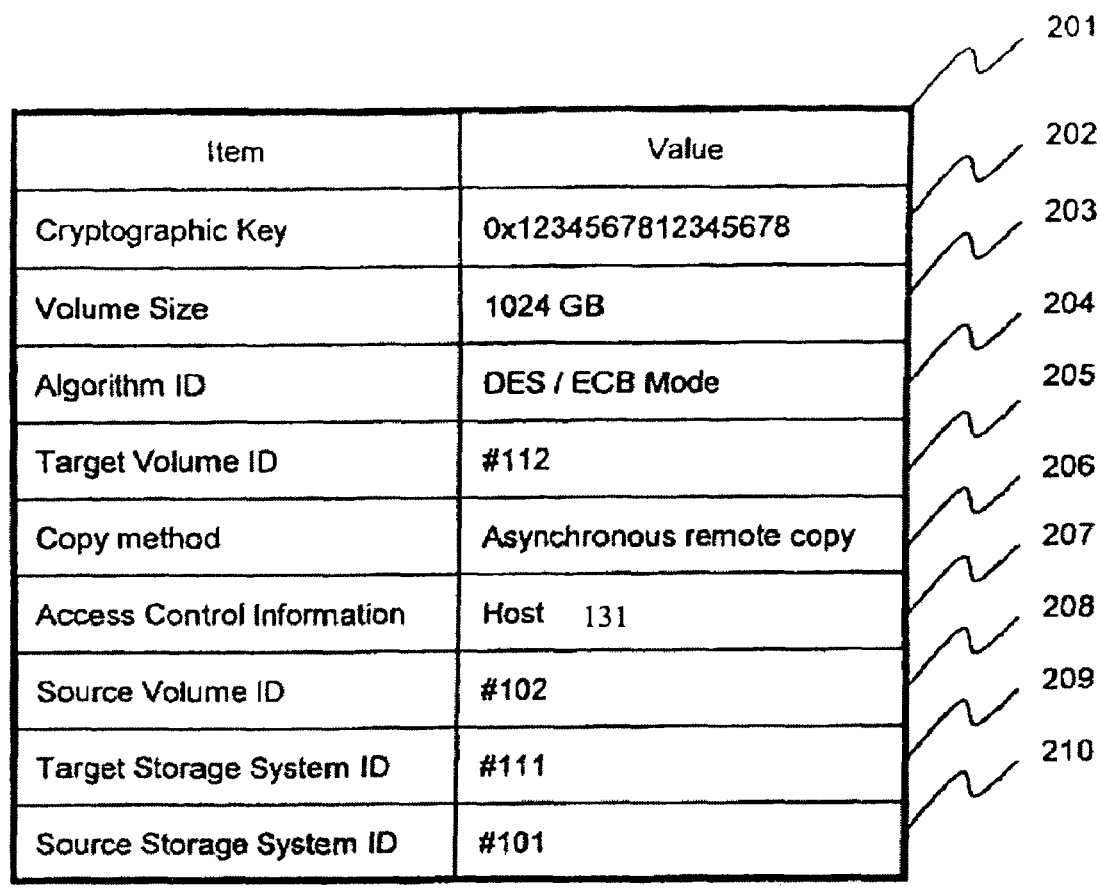
FIG. 2 is an example structure and content of a Remote Copy Configuration Information (RCCI) record according to an embodiment of the present invention.

The present invention includes backup of Remote Copy Configuration Information (RCCI)for data encrypted and stored on the secondary storage system. Primary storage system 101 and tertiary storage system 121 use the Remote Copy Configuration Information (RCCI) to perform restoration of data from secondary storage system 111. The RCCI includes, for example, information about the storage location of the encrypted data, storage location of the data prior to being encrypted, and encryption information identifying how the data was encrypted, and which can be utilized to decrypt the data. FIG. 2 is an example of an RCCI.

Preferably, each RCCI is associated with a pair of volumes which are a source volume specified in 208 (e.g., volume 102 in this example) of a source storage system specified in 210 (e.g., primary storage system 101) and a target volume specified in 205 (e.g., volume 112) of a target storage system specified in 209 (e.g., secondary storage system 111). In one embodiment, target and source storage system IDs (e.g., 209 and 210) are manufacturer's serial numbers that uniquely identify storage systems. The storage systems may be, for example, Hitachi Lightning 9900™ V Series enterprise class storage systems, Hitachi's Thunder 9500™ V Series systems, or other appropriate data storage systems.

RCCI 201 also includes cryptographic key 202, target volume size 203, algorithm ID 204, target volume ID 205, copy method 206 and access control information 207. Depending on the algorithm used for the encryption and decryption, cryptographic key 202 may consist of several values. For example, the Data Encryption Standard (DES) uses only one 8 byte value as both an encryption and decryption key, whereas RSA uses different keys for encryption and decryption. Volume size 203 contains the size of the volume 102.

Algorithm ID 204 is used for encryption and decryption processing. "DES EBC Mode" in algorithm ID 204 indicates an example of algorithm ID to show that each 8 byte block of data is encrypted or decrypted by DES (Data encryption standard) with ECB (Electric Cook Book) Mode, i.e. each 8 byte block is encrypted or decrypted independently. Of course, if the algorithm to be used for encryption and decryption is fixed, there is no need to have this field in RCCI.

Target volume ID 205 is an ID of volume in secondary storage system 111 where data in the volume associated with RCCI 201, in this case volume 102, is intended to be copied, in this case the target volume is 112.

Copy method 206 indicates how the remote copy is done; the examples of copy method are synchronous remote copy and asynchronous remote copy.

Access control information 207 may contain WWNs (Worldwide names) of HBA (Host Bus Adaptor) or host names which are allowed to access the volume 102.

Any of the fields of the RCCI 201 may contain values as described, or, alternatively any one or more fields may be a reference (e.g., pointer) to another file or field where the value or field item is found. For example, in one embodiment, the Algorithm ID 204 contains a pointer to the encryption algorithm. In yet another embodiment, the Algorithm ID 204 contains an indirect reference (e.g., pointer to a pointer to the encryption algorithm). In such embodiments, certain pointer values or storage locations (e.g., storage of the encryption algorithm) on both the primary storage system and backup storage system (e.g., trusted computer, tertiary, etc.) are updated to be consistent and/or point to the appropriate locations as referenced by the RCCI field values.

RCCI 201 is transferred to trusted computer system 133, which could be host 131, a smart card, or tertiary storage system 121. In some embodiments, the trusted computer system may also be embodied as a management server or a secondary storage system. Trusted computer system 133 is connected with primary storage system 101, for example, through interface 109, and tertiary storage system 121 through interface 129 when needed. This transfer is protected with security so that at least cryptographic key 202 is kept confidential. Any technologies, such as Secure Socket Layer (SSL) or Transport Layer Security (TLS), can be used to keep the confidentiality. Though SSL or TLS is basically a protocol over TCP/IP network, similar technologies can be used for other networks, such as a Fibre Channel network. The RCCI transfer session may also be authenticated between the entities involved in the session, particularly if the network is not secure. The authentication may be also performed by any number of technologies, such as SSL or TLS. RCCI 201 is stored at the trusted computer system 133. Secure storage for the RCCI 201 is provided if there is a possibility for the trusted computer system 133 to be accessed by unauthorized persons. For example, RCCI 201 can be stored in encrypted form or in a smart card which is protected with a personal identification number of privileged person.

Figure 3:
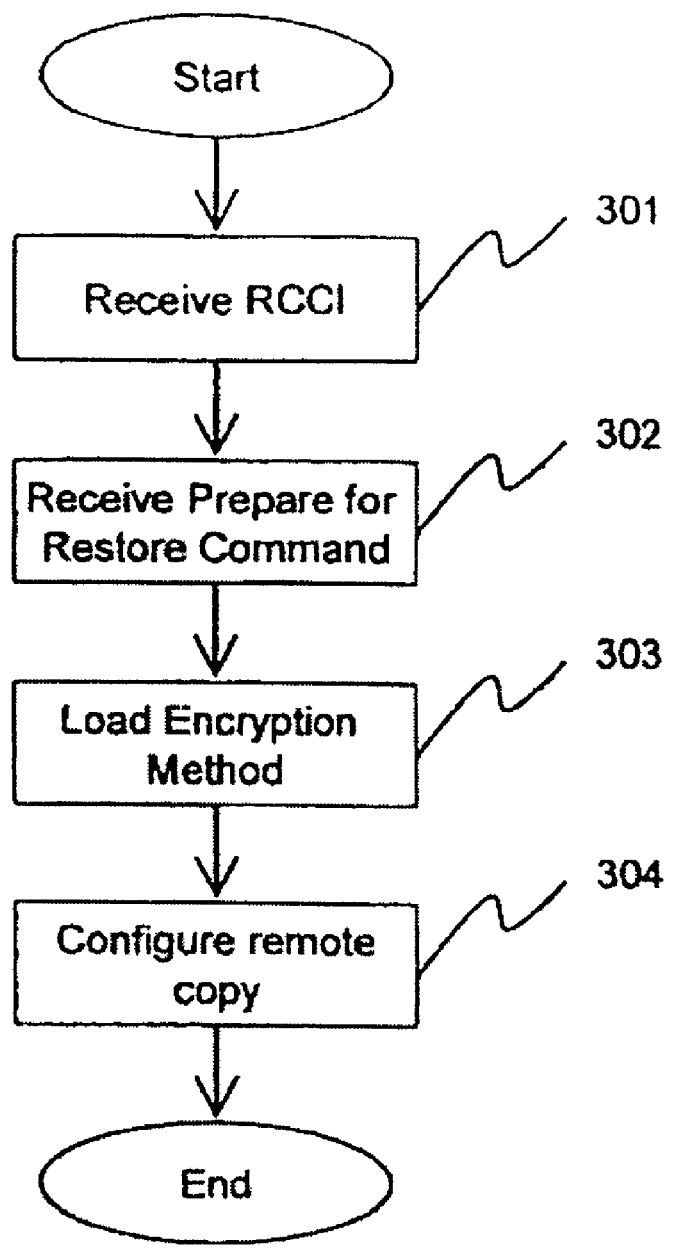
FIG. 3 is a flowchart illustrating a process flow at a tertiary storage system upon failure of a primary storage system according to an embodiment of the present invention.

Because RCCI is associated with one volume, there may be a plurality of RCCIs for one storage system. In one embodiment, the RCCI itself is segmented with fields for different portions of the volume to which it is associated. The segmentation of the RCCI allows for retrieval/restoration of a single or multiple segment of the volume. In another embodiment, separate RCCIs are generated for each of several segments within a volume (e.g., Vol. ID of the RCCI becomes Volume and Segment ID). The encrypted secondary site data is restored when the primary storage system fails FIG. 3 provides an example process flow performed by tertiary storage system 121 when primary storage system 101 fails. At step 301, tertiary storage system 121 receives RCCI 201 from trusted computer system 133. If RCCI 201 has been directly transferred from primary storage system 101, i.e. tertiary storage system plays the role of 133, step 301 is omitted. RCCI 201 can be protected by authentication and/or another confidentiality technique if the network is not secure.

At step 302, tertiary storage system 121 receives a command which indicates to prepare for restoring data from secondary storage system 111. The command for restoration is received from, for example, a technician, or an automated command from a management server. In one embodiment, the command is initiated by a management server that monitors status of the primary storage systems. The command may be sent as noted above, when the primary system fails. In one embodiment, the command my be sent if the primary storage system is overloaded with data requests and the management server decides to operate in a dual storage system environment. In this embodiment, additional management server functions include, for example, synchronization of the dual storage system.

At step 303, the tertiary storage system loads a cryptographic method, such as cryptographic key 202 and/or algorithm logic indicated by algorithm ID 204 onto memory 105 and CPU 106. The cryptographic program is, for example, a DES algorithm that is accessed via the program name. In another embodiment, the algorithm is loaded into a predetermined storage place (e.g., specific address) on the tertiary system. In yet another embodiment, the cryptographic program is loaded into any free memory space (including disk space), and a reference pointer is updated to point to or otherwise identify the storage location of the cryptographic program.

At step 304, the remote copy is configured. This configuration can include creating a volume 122 whose size is indicated by 203, setting volume 112 as a remote copy source volume using target volume ID 205, restricting access to the volume 122 only to those specified in 207, and so on.

When the remote copy is configured, tertiary storage system 121 is ready to receive command to start remote copy from secondary storage system 111 to tertiary storage system 121. In one embodiment, during the remote copy, tertiary storage system 121 receives blocks of data from secondary storage system 111, decrypts them and stores them on volume 122. Thus, in most embodiments described herein, the secondary storage system is normal storage, without need for cryptographic functionality for encrypting or decrypting data.

Restoration of target volume data is not necessarily performed through remote copy and, for example, can be performed as follows; secondary storage system 111 copies data in the volume 112 onto a tape, and the tape is physically transferred to tertiary storage system 121, and then tertiary storage system 121 reads the data in the tape. In one embodiment, secondary storage system 111 stores the encrypted data on one or more disk drives, and the disk drives themselves are transferred to the tertiary system. The data is then transferred to the tertiary storage system, or the physically transferred disk drives are installed in the tertiary storage system and are directly accessed as part of the tertiary storage system.

Figure 4:
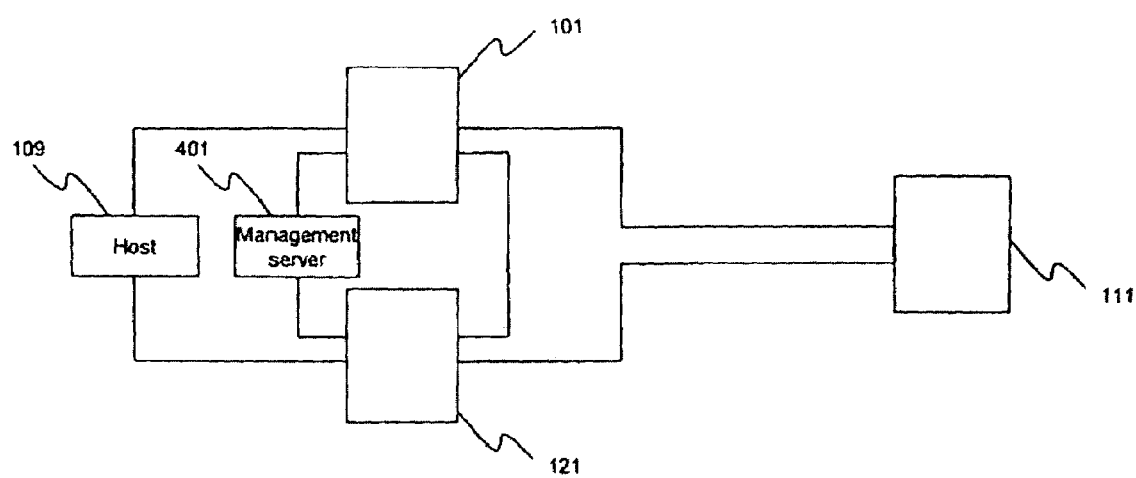
FIG. 4 is a block diagram of a host, storage system, and a management server configuration according to an embodiment of the present invention.

The RCCIs are, for example, backed up to the tertiary storage system. FIG. 4 is one of the embodiments of the invention. A management server 401 is configured to manage remote copy operations among storage systems 101, 111, and 121. FIG. 4 shows management server 401 and host 131 as separate computers. The separate computers may be directly connected via a network, serial bus, parallel port, an I/O port, etc. However, the computers and/or their processing capabilities are not necessarily physically separate from each other.

In this embodiment, it is assumed that primary storage system 101 backs up several RCCIs to tertiary storage system 121. In this embodiment, tertiary storage system 121 is used to, for example, replace the primary storage system upon failure. In the interim before failure, the tertiary storage system 121 also performs the role of trusted computer system 133 in that it backs up the RCCIs.

When primary storage system 101 becomes unavailable and management server 401 notices it, management server 401 sends a command which indicates to prepare for restoring data from secondary storage system 111 as shown in step 302. Step 302 also includes creation of a volume to store the data restoration. The volume may exist prior to the restoration, or may be created "on the fly" after the need for restoration arises. The volume may be created from a single disk or storage system, or may be created from available storage space across multiple drives and/or storage systems. Since tertiary storage system 121 has already received RCCIs, step 301 can be omitted.

When management server 401 notices the end of the preparation process, it then issues a command to start remote copy from secondary storage system 111 to tertiary storage system 121. Tertiary storage system 121 receives blocks of data from secondary storage system 111 that were originally encrypted at primary storage system 101. The tertiary storage system 121 finds associated cryptographic method, decrypts the data and stores it onto an associated volume. In one embodiment, tertiary storage system 121 starts the remote copy automatically without an instruction from management server 401.

When data restoration finishes, tertiary storage system 121 becomes ready to accept I/Os from host 131 and copy data to secondary storage system 111. Tertiary storage system 121 copies data to secondary storage system 111 after encrypting data using the same key as had been used at primary storage system 101. After the primary storage system is repaired, the encrypted data on the secondary storage system (and RCCI, if needed) are transferred to the primary storage system for restoration. In one embodiment, as soon as primary storage system fails, the RCCIs are backed up to a third computer (e.g., trusted server), so that at all times the RCCIs are backed up at a fully functional and secure location.

Figure 5:
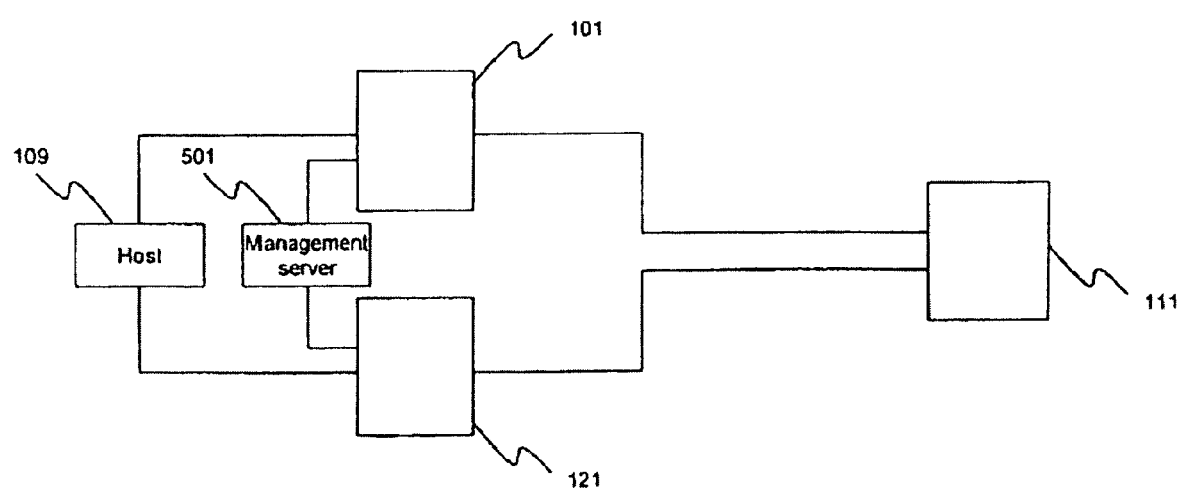
FIG. 5 is a block diagram of a host, storage systems, and a management server configuration according to an embodiment of the present invention.

In one embodiment, the RCCIs are backed up to a management server. FIG. 5 shows another embodiment of the invention. Primary storage system 101 backs up RCCIs to management server 501. In this embodiment, the management server 501 plays the role of trusted computer system 133 in that the RCCIs.

When primary storage system 101 becomes unavailable and management server 501 notices it, management server 501 sends the RCCIs to tertiary storage system 121 as is specified in step 301. Preferably, communications between management server 501 and tertiary storage system 121 are protected using an encryption and authentication mechanism such as SSL.

In one embodiment, a restoration of the primary storage system is performed using the encrypted data stored at the secondary storage system. The encrypted data is copied and decrypted at the tertiary storage system similar to that described above with reference to FIG. 4, except that the RCCIs are transferred from the management server to the tertiary storage system prior to decryption of the encrypted data.

Thus, in one embodiment, the invention includes backing up RCCI(s) to a management server, monitoring of the primary server by the management server to detect possible failure, and ordering the tertiary server to begin a recovery effort to replicate the primary server using the RCCI(s) and encrypted data transferred from the secondary storage system.

Figure 6:
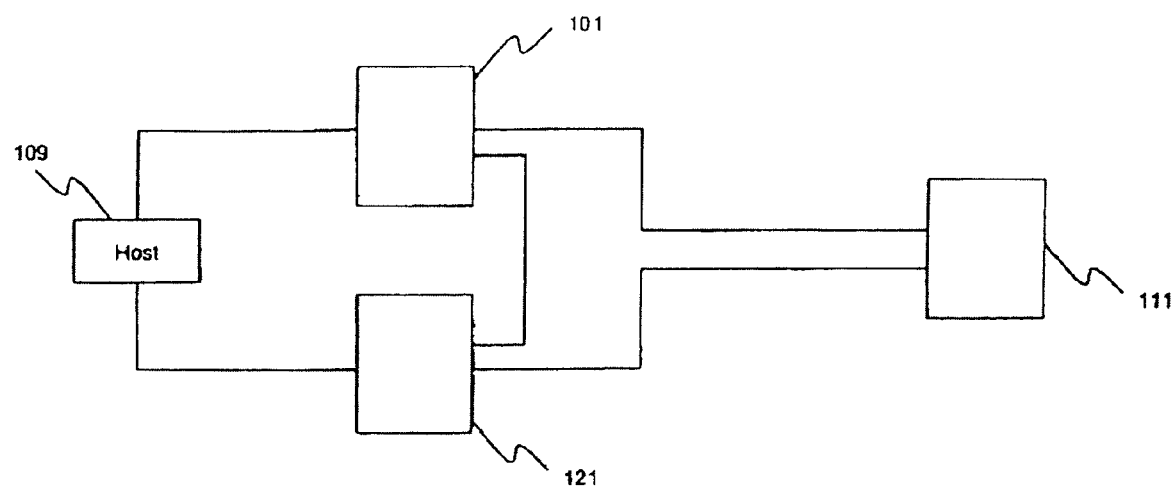
FIG. 6 is a block diagram of a host and storage system systems configuration according to an embodiment of the present invention.

In one embodiment, the RCCIs are backed up to a tertiary storage system and failover (recovery of a primary storage system failure) occurs automatically. FIG. 6 shows yet another embodiment of the invention. RCCIs are backed up to tertiary storage system 121. Tertiary storage system 121 receives heartbeat signals of primary storage system 10 1.

The heartbeat signals allow tertiary storage system 121 to detect failure of primary storage system 101. The heartbeat signal is, for example, a plain signal indicating the primary storage system is up. In one embodiment, the heartbeat signal includes status, such as, for example, an average response time for read and/or write requests of the primary storage system. The heartbeat signal may be transmitted, for example, via a serial, parallel, bus, or network connection between the primary storage system 101 and secondary storage system 121. In one embodiment, the heartbeat signal is transmitted wirelessly. When tertiary storage system 121 detects the failure, it starts preparation for restoration and then automatically starts remote copy from secondary storage system 111.

By being equipped with the function to detect failure of the primary storage system 101, tertiary storage system 121 can start restoration process without being commanded by a management server. In this embodiment, tertiary storage system 121 is always coupled with primary storage system 101 to receive heartbeats from it.

Clustering technologies may be utilized to detect failure of pre-defined computer systems. Such technologies may be applied to detect failure of the primary storage system 101, and therefore, such technologies can be used instead of receiving heartbeats of primary storage system 101.

Figure 7:
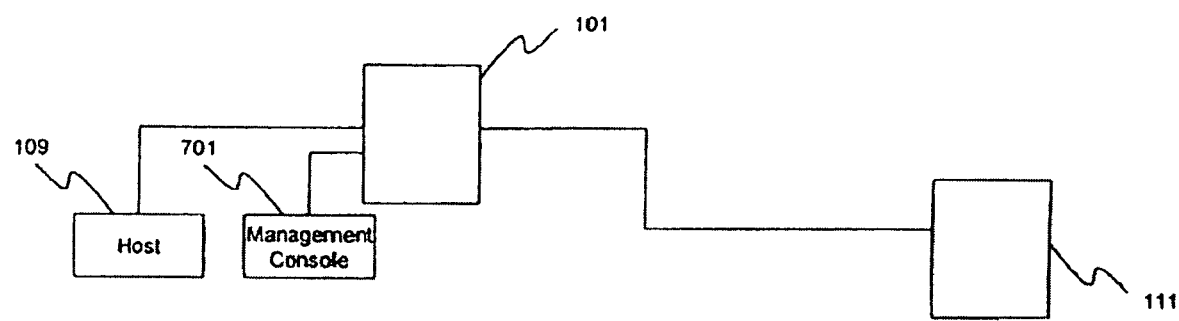
FIG. 7 is a block diagram of a host, management console, and storage systems according to an embodiment of the present invention.

The present invention provides for contingencies such as loss of RCCIs at the primary storage system. FIG. 7 shows another embodiment of the invention. There may be a situation where primary storage system 101 loses some information, such as an encryption and decryption key. This results, for example, in the primary storage system being unable to perform remote copy operations to the secondary storage system 111 due to some failure, but that other functions are recoverable in a timely manner.

One example is the case where primary storage system 101 loses only the encryption and decryption keys, and other data inside volume 102 is not damaged. In this case, RCCIs which are backed up to trusted computer system 133, such as management server 701, are sent to primary storage system 101, and primary storage system 101 loads the RCCIs on the memory 105 and CPU 106, then primary storage system 101 becomes operable. Remote copy operations from the primary storage system to the secondary storage system are suspended until RCCIs are loaded on the memory 105 again.

Figure 8:
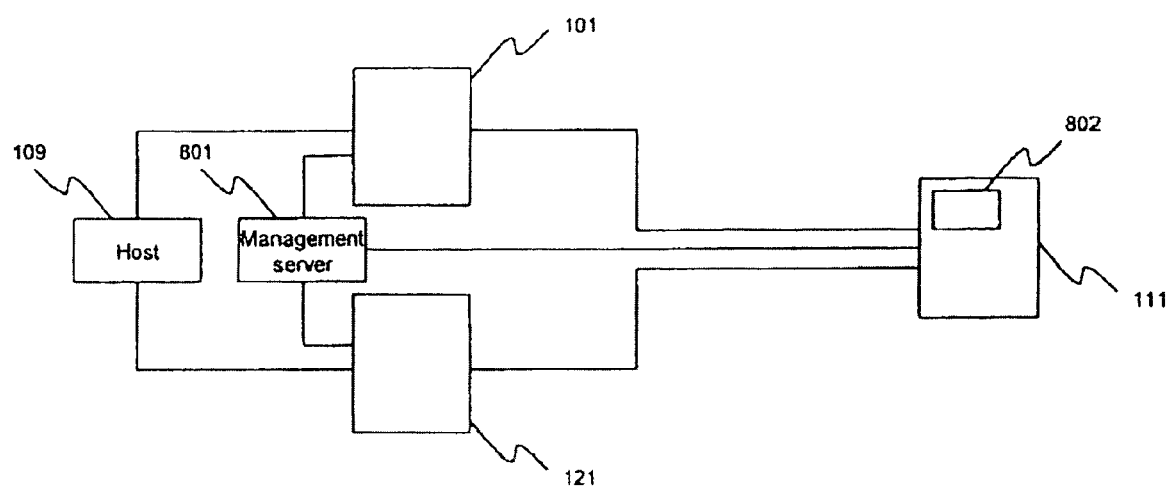
FIG. 8 is a block diagram of an example configuration of a secure module RCCI backup technique according to an embodiment of the present invention.

In several embodiment, RCCIs are backed up to a secondary storage system. FIG. 8 illustrates an embodiment of the present invention where RCCIs are backed up to secure module 802 in secondary storage system 111.

Secure module 802 can be integrated in disk controller 114 or can be separate module from disk controller 114. An advantage to integrating a secure module into the disk controller is it is generally less vulnerable to malicious attack. Data inside secure module 802 is protected securely and no access is allowed without a privileged entity's permission. An example of the implementation of secure module 802 can be a smart card. When a privileged entity makes an appropriate request, secure module 802 provides requested RCCI to a specified computer system.

Thus the present invention may be implemented such that the RCCI is backed up at the secondary storage system. Preferably, the secondary storage system is equipped with a secure module (e.g., smart card device) where the RCCI is protected by a PIN, password, etc. Recovery from such an arrangement is initiated, for example, by sending the RCCI to the tertiary storage system after appropriate authentication of an entity making a recovery request. Alternatively, the data may be decrypted at the secondary storage system using the RCCI stored in the secure module, and the decrypted data is then sent to the tertiary server. In yet another alternative, the decrypted data may be hosted at the secondary storage system and, for example, data requests/writes are communicated between a host of the primary storage system and a host associated with the secondary storage system (e.g., a data request communicated from Host 131 to the secondary storage system 111 via interface 108). In each embodiment, data transfers, whether in the form of RCCI transfers, or transfers of data decrypted at the secondary storage system are not performed unless appropriate authentication has been performed.

For example, a disk controller of the secondary storage system is configured to securely handle both authentication and the result of the authentication. In one embodiment, the authentication and result are securely handled by a smart card, and additional access controls are preferably handled via similarly secure transactions. Thus, the disk controller in combination with the smart card (or other secure module) is capable of preventing malicious or unintended access to the data. RCCI transfers to/from the secondary storage system are the sole responsibility of the secure module and are always handled securely. Encrypted data can be transferred by the disk controller alone because of the encryption. Decryption and then transfer of data outside the secondary storage system is only performed after successful authentication.

Figure 9:
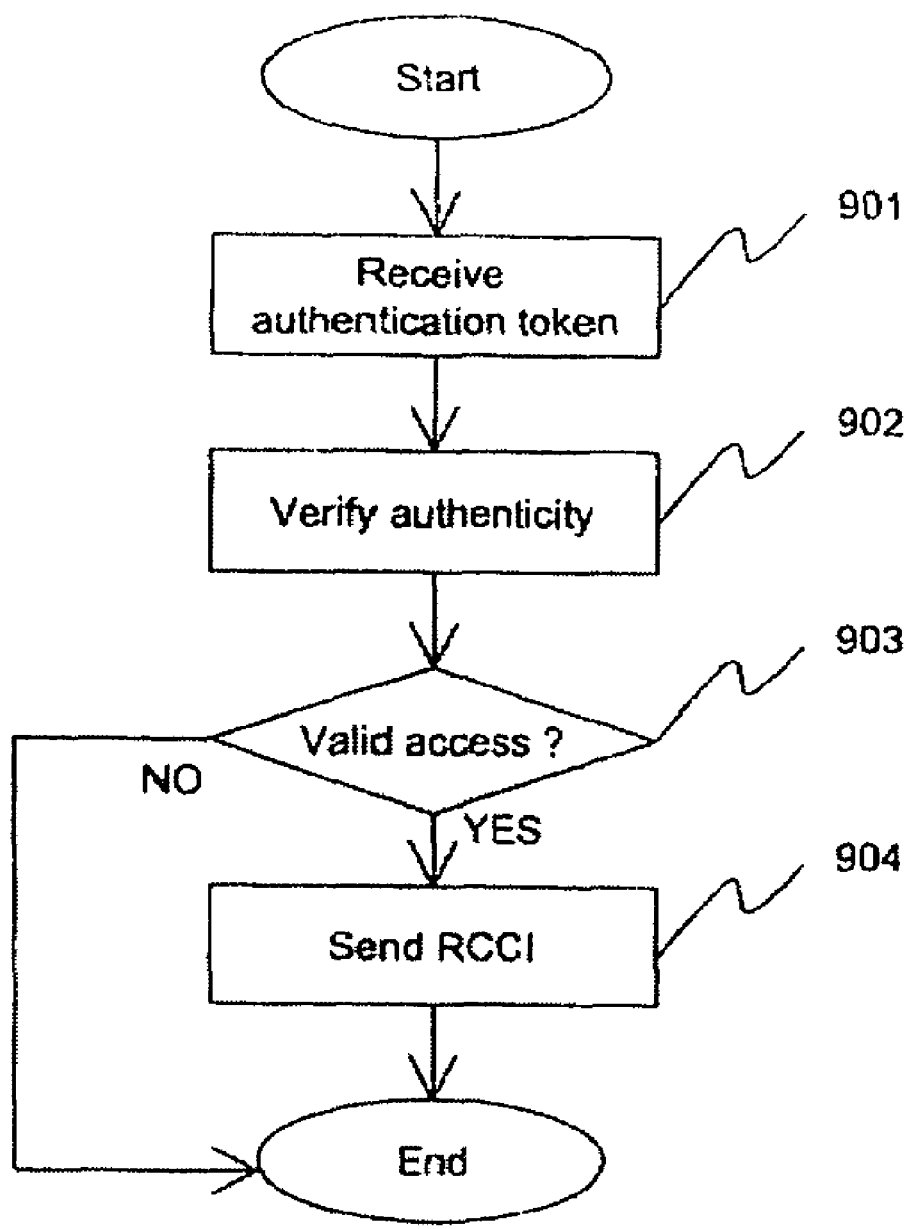
FIG. 9 is a flowchart of an example secure module RCCI backup according to an embodiment of the present invention.

FIG. 9 illustrates a process flow where a secure module (e.g., secure module 802) provides tertiary storage system 121 with an RCCI. At step 901, secure module 802 receives an authentication request from management server 801 or tertiary storage system 121. The authentication request includes an authentication token as well as a request for RCCIs. For example, a shared secret data, data cryptographically signed with public key, or shared secret key of a DES algorithm, or the like may be utilized. In one embodiment, depending on an environment in which the storage systems are located, only an ID or a personal identification number assigned for an authenticatee may be used. Secure module 802 verifies the received authentication token at step 902. If the verification succeeds (step 903), secure module 802 sends back the requested RCCI (step 904). This RCCI is, for example, to be set on tertiary storage system 121, and tertiary storage system 121 starts preparation for restoring data from secondary storage system 111.

If the verification fails, secure module 802 declines the request for RCCIs. In one embodiment, secure module 802 may also be configured to detect consecutive failure of authentication tries and decline any further authentication try when the number of trial reaches pre-defined criteria. Secure module 802 can also have a function to send an alert (e.g., e-mail alert to a technician or manager) when a situation occurs where the number of authentication failures reaches a pre-defined criteria or some other type of attacks/failures are attributed to a certain person/user.

Preferably, the communication link between secure module 802 and management server 801 or tertiary storage system 121 is confidentially protected via an authentication technique, such as SSL or TLS.

Figure 10:
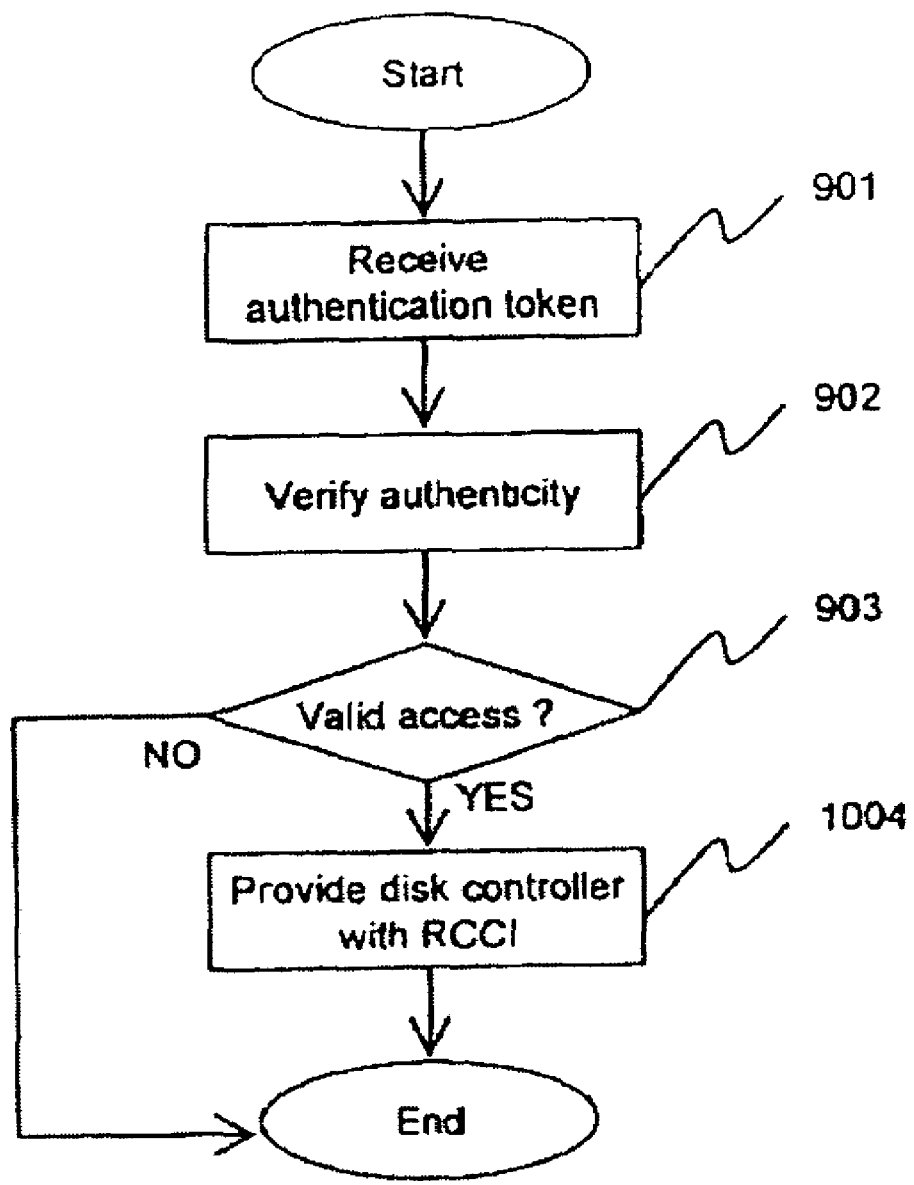
FIG. 10 is a flowchart of an example process for providing a securely protected RCCI according to an embodiment of the present invention.

FIG. 10 shows another process flow where secure module 802 provides disk controller 114 with a securely protected RCCI. In this flow, secure module 802 provides the RCCI to disk controller 114 at step 1004, instead of the management server 801 or tertiary storage system 121.

Figure 11:
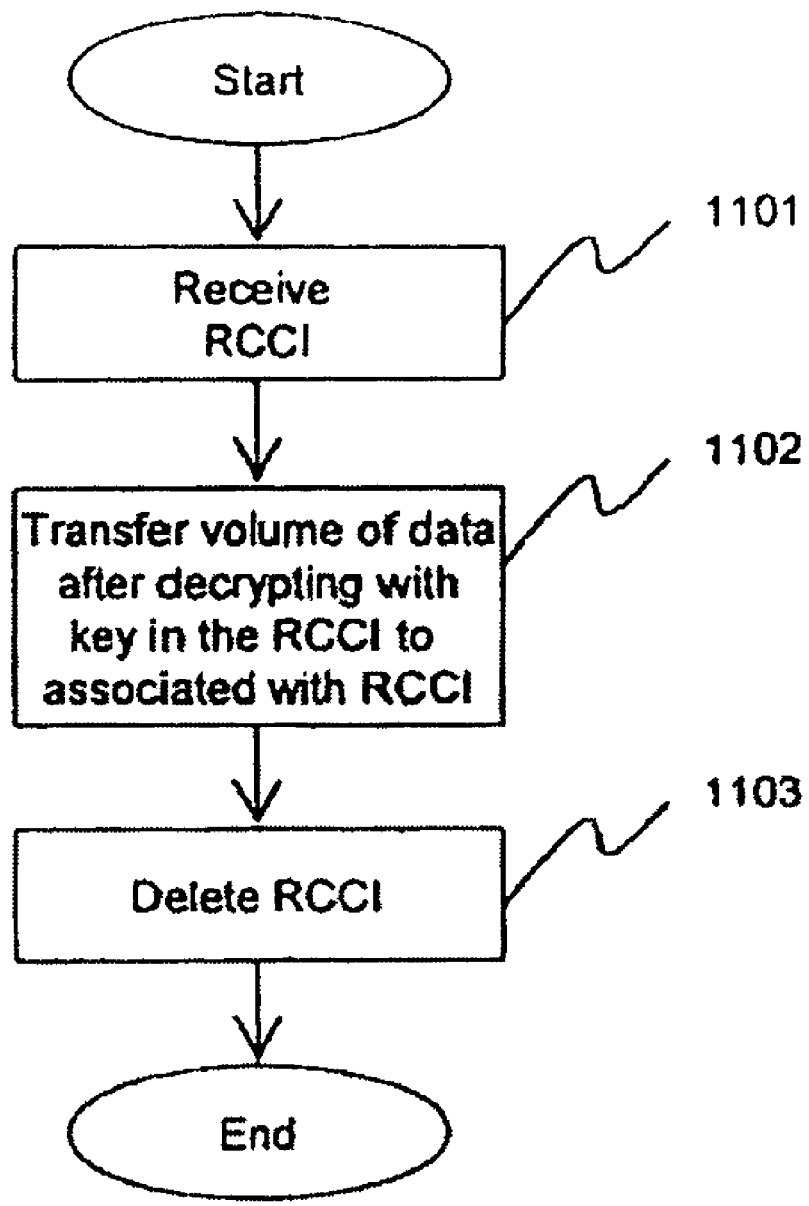
FIG. 11 is a flowchart of an example process for a controller according to an embodiment of the present invention.

In one embodiment, the disk controller (e.g., disk controller 114) transfers data upon a proper request/command, for example, upon receipt of an RCCI. FIG. 11 shows a process flow of disk controller 114 when it receives an RCCI. When disk controller 114 receives RCCI 201 at step 1101, it starts transferring the data in the volume 112 which is specified in 205, for example, to a newly created volume of the tertiary storage system as explained in step 304. In one embodiment, before transferring the data, disk controller 114 decrypts the data using the key specified in 202 (step 1102).

Alternatively, in addition to authentication, which may occur concurrently or as a separate message to the disk controller 114, only information identifying the encrypted data and a storage system where the data is being restored to is sent to the disk controller 114. The disk controller 114 responds by transferring the encrypted data to a recipient storage system 121 where it is decrypted and "restored".

When step 1102 finishes, RCCI 201, which is stored in memory 115 and/or loaded into CPU 116 in the disk controller 114, is deleted (step 1103).

When the data is transferred to another storage system (e.g. tertiary system), it is possible to discard the data in the secondary storage system because the primary storage system still holds the data awaiting to be placed back on-line. However, tertiary storage system then, particularly any updates, are backed up to another secondary storage system. In one embodiment, for updates, tertiary storage system 121 uses a different encryption key from that which was used by primary storage system 101.

Secure modules may be utilized in both primary and tertiary storage systems. In the embodiment described above, only the secondary storage system 111 has a secure module 802, because secondary storage system 111 is managed by, for example, a 3rd party organization which may not be fully secure and/or trusted. However, primary storage system 101 or tertiary storage system 121, even when located at secure or trusted facilities, may also be equipped with secure modules to protect information such as cryptographic keys securely using authentication tokens or other security techniques.

Figure 12:
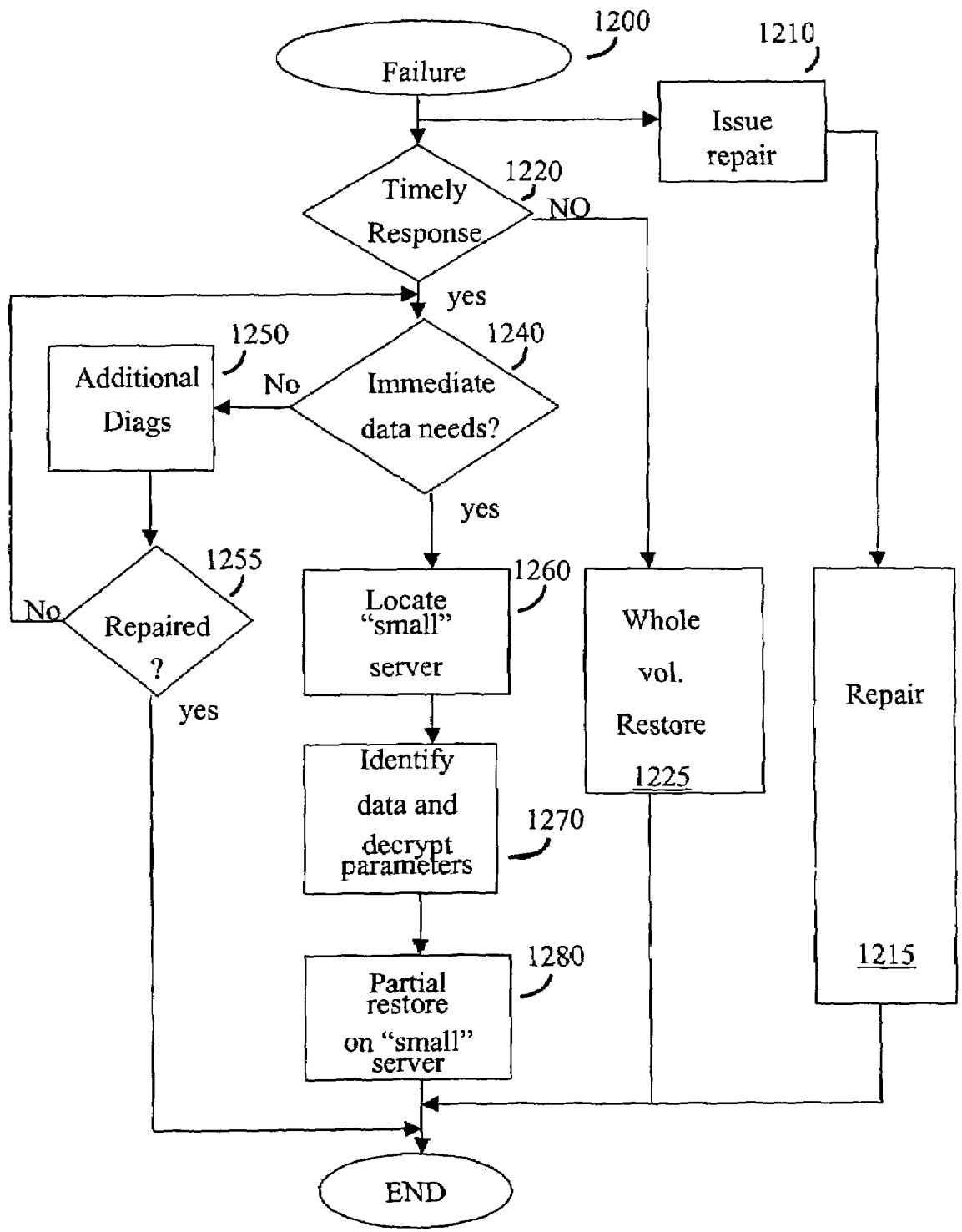
FIG. 12 is an example flowchart of an implementation and use of an encrypted remote restore operation according to an embodiment of the present invention.

FIG. 12 is an example flow chart of an implementation and use of an encrypted remote restore operation according to an embodiment of the present invention. At step 1200, a failure of a primary storage system (e.g., primary storage 101) is detected. The detected failure may be, for example, failure of a disk drive in the primary storage system (e.g., head crash, motor failure, or other malfunction), a controller failure, malicious virus, electrical spike affecting operation of the primary storage. The failure is detected, for example, by the management server (e.g., missing heartbeat and/or built-in-test (BIT) results, periodic maintenance, etc.).

At step 1210, a repair message is issued to conduct a repair at step 1215. If a BIT or other diagnostic routine is run, the results are, for example, included in the repair message. The diagnostic results may take the form of orders to perform specific operations to get the storage system back on-line. The orders may include, for example, a command to reboot one or more servers, reboot a disk controller, activate further diagnostics and/or advise a technician or other support personnel of a faulty drive or other potential problems in need of further investigation.

At step 1220, it is determined whether or not the problem is timely repairable. In this context, timely repairable is if an estimated time to get the primary storage system back on-line is less than an estimated time before the volume needs to be accessed in a manner that requires all data in the volume to be available. The decision may be based, for example, on how the data is backed up (e.g., particulars of a remote encrypted copy), historical accesses to the volume, and an estimated time to repair. For example, if the volume is backed up as a single non segmented volume, historical data accesses to the volume are frequent, and the estimated time to repair is long (e.g., replacement of a disk drive), then the problem is not timely repairable. On the other hand, if the historical accesses are infrequent, and the estimated time to repair is short (e.g., a single server re-boot), then the problem is timely repairable. Further, if immediate data needs from the volume can be met with "smaller" restorations of specifically identified segments of the volume, and the encrypted remote copy of the volume has enough information to be able to restore the immediate needs, the problem is also timely repairable.

If the problem is not timely repairable, the primary storage system is backed up from an encrypted remote copy consistent with any of the previously described or equivalent whole restoration processes (step 1225). If the problem has been determined to be timely repairable and there are no immediate data needs, the management server (or other server) focuses on preparing for incoming data needs, or requests for data from the primary storage system that arrive after the failure (step 1250). The management server may also run additional BITs or diagnostics that do not conflict with repair being done to help insure that the problem or problem area was correctly identified. If the problem is repaired, no further diagnostics are needed, and the process completes (step 1255), otherwise a loop is implemented to continually check for new data needs. In one embodiment, the additional diagnostics are interrupted if data needs are received while the additional diagnostics are running.

If the problem is determined to be timely repairable and there are immediate data needs, the management server locates a "small" server (e.g., a portion of the management server's system, a remote server, etc.) suitable for storage of the immediate data needs (step 1260). The immediate data needs are identified within the primary storage by, for example, partition and segment numbers, and the RCCI(s) having the appropriate decryption information (including algorithm and keys) for the identified partitions and segments are located (step 1270). And, at step 1280, a partial restore of at least the immediate data needs is performed on the "small" server. The partial restore operates, for example, similar to any of the above described restoration processes and targets a portion of the volume containing the immediate data needs.

Figure 13:
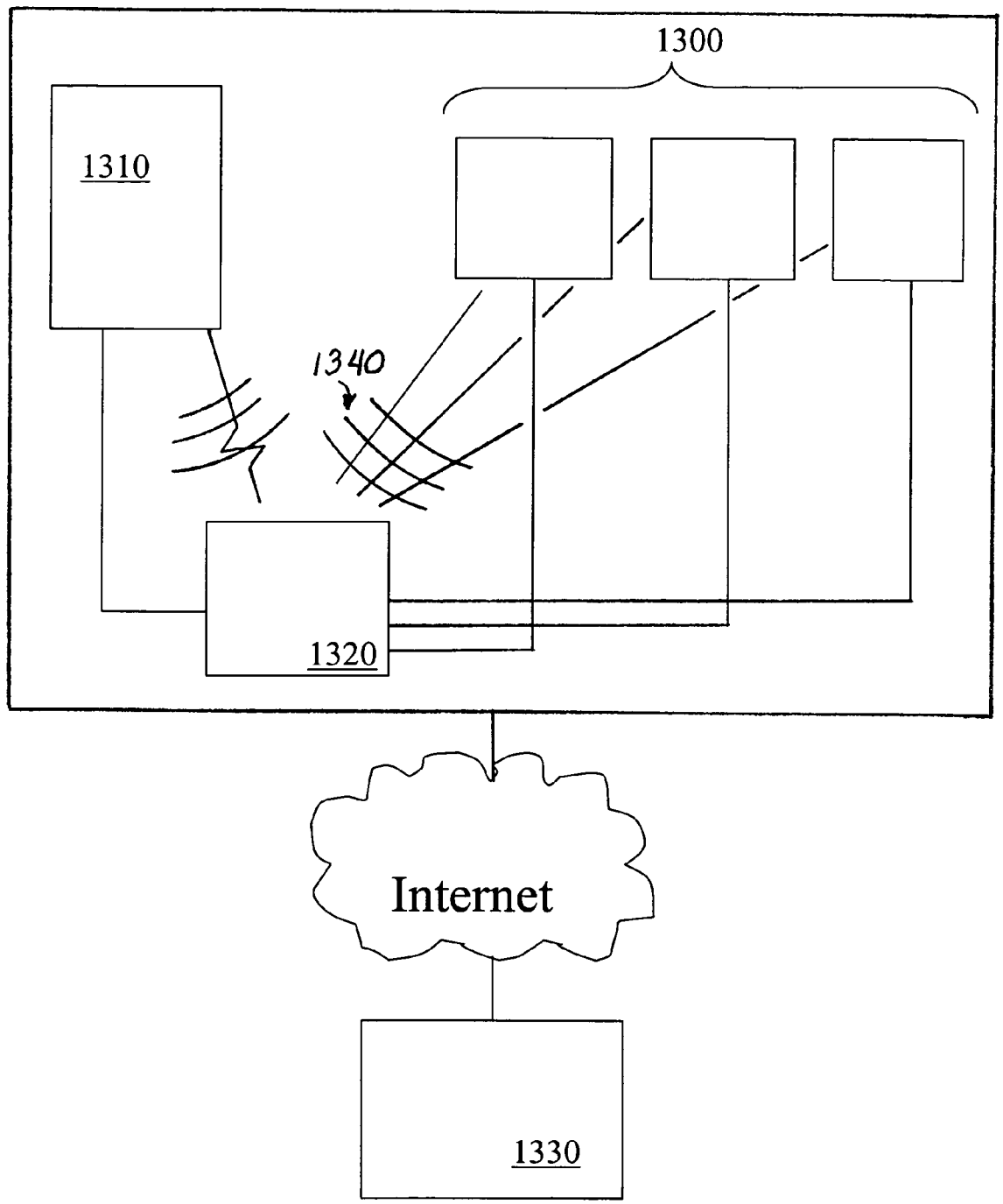
FIG. 13 is a diagram of an arrangement of storage systems according to an embodiment of the present invention.

FIG. 13 is a diagram of an arrangement of storage systems according to an embodiment of the present invention. A bank of primary storage systems 1300 and a tertiary storage system 1310 are coupled to a management server 1320. The primary and/or tertiary storage systems are, for example, constructed using a set of Hitachi Lightning 9900™ V Series enterprise class storage systems. Smaller storage systems such as Hitachi's Thunder 9500™ V Series systems, and storage systems from other manufacturers may also be utilized. The storage systems are configured as described above, including software and/or firmware and/or hardware configured according to one or more of the embodiments described herein. Each primary storage system is, for example, individually backed up as described above to an off-site, possibly 3rd party, storage system (e.g., storage system 1330). RCCI keys for each storage system backed up are stored in at least one of the tertiary storage system 1310 and/or management server 1320. A wirelessly transmitted heartbeat signal 1340 from each of the primary storage systems is sent to the management server 1320 which monitors the health of each primary storage system. A failure on any of the primary storage systems initiates a data backup ("restore") of the failed storage unit to the tertiary storage system 1310. In one embodiment, a tertiary storage system is not used, but free space on each of the remaining primary storage systems is pooled (e.g., under the management of the management server 1320) and used to form a virtual volume to which the restoration of the failed storage system is performed.

Although the present invention has been described herein mainly with reference to data storage systems, the devices and processes of the present invention may be applied to other types of systems having a data storage component or having data to be securely stored off site.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing a data storage system, any device or system capable of storing data, along with appropriate communication and/or other processing capabilities as described herein may be substituted. Example data storage systems include, but are not limited to, disk drives (e.g., optical, magnetic), tape drives, hosts, servers, clients, web servers, data warehousing, virtual storage devices, Internet storage devices, RAID devices, or other devices having an equivalent function or capability, whether or not listed herein. Furthermore, the inventors recognize that newly developed technologies not now known may be substituted for the described parts and still not depart from the scope of the present invention. All other described items, including, but not limited to hosts, controllers, servers, communications systems, etc should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software, for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, encryption and decryption of data, communicating and saving data, including cryptographic keys and/or RCCI records, requesting data from secondary, tertiary, and/or other storage systems, testing data storage systems, including BITs and heartbeat determinations, managing the processing described herein, and the display, storage, or communication of results according to the processes of the present invention (e.g., notifying technicians or management programs of system health, status of backups, etc.).

The present invention may suitably comprise, consist of, or consist essentially of, any of element (the various parts or features of the invention, (e.g., servers, storage systems, controllers, communication systems, programs, and processes) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A method, comprising the steps of:

encrypting original data stored at a plurality of source volumes of a primary storage system located at one source location per volume with one of a plurality of encryption algorithms stored at the source location as selected at the time of encrypting;

storing the encrypted data in a plurality of target volumes of a secondary storage system located at one target location;

creating and storing at the source location an encryption information record comprising a plurality of remote copy configuration information records (RCCIs) each including a cryptographic key, an identifier of one of the source volumes of the original data, an identifier of a corresponding one of the target volumes, and an identifier of a corresponding encryption algorithm used to encrypt the original data stored at said one source volume;

copying the encryption algorithms and the encryption information record from the primary storage system to a tertiary storage system which is other than the primary and secondary storage systems;

detecting a failure in the primary storage system by a management server configured to manage remote copy operations among the primary, secondary and tertiary storage systems;

sending a repair message to perform a predetermined repair operation to get the primary storage system back on-line after detecting the failure;

determining whether or not the detected failure is timely repairable;

if the detected failure is determined as not timely repairable, fully restoring the original data of the primary storage system in the. tertiary storage system by: transferring the encrypted data from the target volumes to the tertiary storage system;

decrypting per volume at the tertiary storage system the encrypted data transferred thereto, with said cryptographic key in each RCCI in the encryption information record, and with said corresponding encryption algorithm as identified by the identifier of the encryption algorithm in said each RCCI in the encryption information record; and restoring functionality of the primary storage system at the tertiary storage system using the decrypted data decrypted; and if the detected failure is determined as timely repairable and data requests are received after detecting the failure, partially restoring the original data of the primary storage system by identify partitions and segments in the primary storage system containing data in the data requests received;

locating a portion of the management server or a remote server for the partial restoration; and restoring said data in the data requests in said portion of said server, wherein the detected failure is timely repairable if an estimated time to get the primary storage system back on-line is less than an estimated time before the source volumes need to be accessed, and the failure detection is performed using clustering technology.

2. The method according to claim 1, wherein the encryption algorithm ID comprises an indirect reference to the selected encryption algorithm.

3. The method according to claim 1, wherein the tertiary storage system is a smart card or comprises a smart card.

4. The method according to claim 3, wherein the smart card is inserted into a disk controller of the tertiary storage system.

5. The method according to claim 4, further comprising the step of initiating the step of transferring encrypted data upon receipt of said each RCCI from the smart card inserted into the disk controller of the tertiary storage system.

6. The method according to claim 1, wherein the encryption algorithms and the encryption information record are copied from the primary storage system to the tertiary storage system using a secure transfer.

7. The method according to claim 1, wherein the source location is remote from the target location.

8. The method according to claim 7, wherein the secondary storage system is managed by a third party.

9. The method according to claim 1, wherein the step of copying the encryption algorithms and the encryption information record occurs upon detection of the failure.

10. The method according to claim 1, wherein the tertiary storage system is located at a location other than the source and target locations.

11. The method according to claim 1, wherein the tertiary storage system is located at the source location.

12. The method according to claim 1, further comprising meeting storage and retrieval needs of the primary storage system through the tertiary storage system.

13. The method according to claim 1, further comprising a step of creating the tertiary storage system by pooling free storage space from at least one available storage system.

14. The method according to claim 1, further comprising the steps of:

determining if the failure includes loss of the information record at the primary storage system; and if the failure includes loss of the encryption information record, then restoring the encryption information record from the tertiary storage system.

15. The method according to claim 1, wherein said step of detecting a failure comprises monitoring a heartbeat of the primary storage system.

16. The method according to claim 15, wherein the heartbeat is wirelessly transmitted from the primary storage system to the management server configured to monitor a plurality of primary storage systems.

17. The method according to claim 1, wherein said step of copying comprises transferring the encryption algorithms and the encryption information record from a smart card to the tertiary storage system.

18. The method according to claim 17, wherein the tertiary storage system receives the encryption algorithms and the encryption information record from the smart card after the failure is detected.

19. The method according to claim 1, wherein:

said step of transferring the encrypted data comprises the steps of, creating a volume on the tertiary storage system;

setting each of the target volumes as a remote copy source volume using the target volume identifier; and performing a remote copy from the remote copy source volume to the volume created on the tertiary storage system.

20. The method according to claim 19, further comprising the step of restricting access of the volume created on the tertiary storage system to a host identified in the encryption information record.

21. The method according to claim 19, wherein:

the encryption information record includes a size of the original volume; and the step of creating a volume on the tertiary storage system comprises creating a volume at least equal to the size of the original volume as specified in the encryption information record.

22. The method according to claim 1, wherein:

said method is embodied in a set of computer instructions stored on a computer readable media;

said computer instructions, when loaded into a computer, cause the computer to perform the steps of said method.

23. The method according to claim 22, wherein said computer instruction are compiled computer instructions stored as an executable program on said computer readable media.

24. The method according to claim 1, wherein said method is embodied in a set of computer readable instructions stored in an electronic signal.

25. The method according to claim 1, further comprising:

receiving an authentication request for storing the encryption algorithms and the encryption information record from the primary storage system to the tertiary storage system;

verifying the authentication request at the tertiary storage system;

if the authentication request is verified, storing the encryption information record and the encryption algorithms on the tertiary storage system.

26. The method according to claim 25, wherein the primary storage system, the tertiary storage system, and the secondary system are physically separate systems.

27. The method according to claim 25, wherein the authentication request is initiated by the management server that monitors a heartbeat of the primary storage system.

28. The method according to claim 25, wherein the authentication request comprises an authentication token.

29. The method according to claim 1, wherein the encryption information record further includes at least one pointer.

30. The method according to claim 1, wherein the encryption algorithm ID comprises a pointer to an encryption algorithm.

31. The method according to claim 1, wherein the encryption information record further includes volume information, and access control information.

32. The method according to claim 1, wherein the volume information comprises the volume IDs and volume sizes.

33. The method according to claim 1, wherein the encryption information record further includes a volume size, a copy method, access control information, a target storage system ID, and a source storage system ID.

34. The method according to claim 1, wherein the encrypted data remains encrypted in the target volume located at a target location.

35. The method according to claim 1, wherein the target volume is located in an unsecured storage system.

36. The method according to claim 1, wherein the target volume is located in a storage system accessible over a public network.

37. The method according to claim 1, wherein said predetermined repair operation to get the primary storage system back on-line includes at least one of a command to reboot one or more servers, a command to reboot a disk controller, a command to activate extra diagnostics, and a command to advise a technician or other support personnel for further investigation.

38. The method according to claim 1, wherein whether the detected failure is timely repairable depends upon on how the original data is backed up, historical accesses to the source volumes, and an estimated time to repair the detected failure.

39. The method according to claim 1, further comprising: if the detected failure is determined to be timely repairable and there are no immediate data requests, preparing for incoming data requests for data in the primary storage system that arrive after detecting the failure.

40. The method according to claim 39, further comprising: running heartbeats or built-in-tests (BITs) without conflicting with repair thereby ensuring that the detected failure or a detected failure area was correctly identified.

41. The method according to claim 40, further comprising: interrupting said heartbeats or BITs when necessary to receive new data requests.

42. A data system, comprising:
a primary storage system located at one source location and comprising a plurality of source volumes of data storage stored with original data;
a secondary storage system located at one target location and comprising a plurality of target volumes of data storage stored with an encrypted backup copy of the original data;
a tertiary storage system, upon detection of a failure in the primary storage system, which restores data of the primary storage system thereinto by decrypting per volume encrypted data from the secondary storage system; and
a management server configured to manage remote copy operations among the primary, secondary and tertiary storage systems,
wherein:
the primary storage system further comprises a memory stored with a plurality of encryption algorithms, an encryption mechanism to encrypt said original data per volume with one of the encryption algorithms as selected at the time of encrypting, and a mechanism to create and store an encryption information record comprising a plurality of remote copy configuration information records (RCCIs) each including a cryptographic key, an identifier of one of the source volumes of the original data, an identifier of a corresponding one of the target volumes, and an identifier of a corresponding encryption algorithm used to encrypt the original data stored at said one source volume, the tertiary storage system comprises memory stored with the encryption algorithms and encryption information record copied from the primary storage system, a decryption and restoration mechanism to decrypt and restore per volume encrypted data transferred from the secondary storage system with the cryptographic key in each RCCI in the encryption information record, and with said corresponding encryption algorithm as identified by the identifier of the encryption algorithm in said each RCCI in the encryption information record, the management server, upon detection of the failure in the primary storage system, sends a repair message to perform a predetermined repair operation to get the primary storage system back on-line, and determines whether or not the detected failure is timely repairable:

(1) if the detected failure is determined as not timely repairable, the management server fully restores the original data of the primary storage system in the tertiary storage system by: transferring the encrypted data from the target volumes to the tertiary storage system;

decrypting per volume at the tertiary storage system the encrypted data transferred thereto, with said cryptographic key in each RCCI in the encryption information record, and with said corresponding encryption algorithm as identified by the identifier of the encryption algorithm in said each RCCI in the encryption information record; and restoring functionality of the primary storage system at the tertiary storage system using the decrypted data; and (2) if the detected failure is determined as timely repairable and data requests are received after detecting the failure, the management server partially restores the original data of the primary storage system by identify partitions and segments in the primary storage system containing data in the data requests received;

locating a portion of the management server or a remote server for the partial restoration; and restoring said data in the data requests in said portion of said server, wherein the detected failure is timely repairable if an estimated time to get the primary storage system back on-line is less than an estimated time before the source volumes need to be accessed, and said detection of the failure is performed using clustering technology.

43. The data system according to claim 42, wherein the management server creates a volume on the tertiary storage system, and is configured to include at least one volume of data storage and a restoration mechanism.

44. The data system according to claim 43, wherein the management server further comprises a monitoring device configured to monitor heartbeat signals transmitted from the primary storage system.

45. The data system according to claim 44, wherein said one source volume is restored at a tertiary storage system upon loss of a heartbeat signal from the primary storage system.

46. The data system according to claim 42, further comprising:

an encryption and save device configured to encrypt the data stored on the primary storage system and save the encrypted data to the secondary storage system.

47. The data system according to claim 42, further comprising:

a secure system, wherein the encryption algorithms and the encryption information record are copied to the secure system before being copied to the tertiary storage system.

48. The data system according to claim 47, wherein the secure system is a secure module that is part of the secondary storage system.

49. The data system according to claim 47, wherein the secure system comprises a trusted computer system.

50. The data system according to claim 47, wherein the secure system is a secure module comprising a smart card device integrated into a disk controller of the secondary storage system.

51. The data system according to claim 47, wherein the secure system is part of a tertiary storage system.

52. The data system according to claim 47, wherein the management server creates a volume on the tertiary storage system, and comprises a monitoring device configured to monitor heart beat signals from the primary storage system.

* * * * *